(12) United States Patent
Magnaldo

(10) Patent No.: US 12,390,747 B2
(45) Date of Patent: Aug. 19, 2025

(54) METHOD FOR COUNTER-CURRENT LIQUID-LIQUID EXTRACTION IN A SUB-MILLIMETRE CONDUIT

(71) Applicant: COMMISSARIAT A L'ENERGIE ATOMIQUE ET AUX ENERGIES ALTERNATIVES, Paris (FR)

(72) Inventor: Alastair Magnaldo, Connaux (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 218 days.

(21) Appl. No.: 18/068,502

(22) Filed: Dec. 19, 2022

(65) Prior Publication Data

US 2023/0191285 A1 Jun. 22, 2023

(51) Int. Cl.
*B01D 17/02* (2006.01)
*B01D 17/12* (2006.01)

(52) U.S. Cl.
CPC ............. *B01D 17/02* (2013.01); *B01D 17/12* (2013.01)

(58) Field of Classification Search
CPC .... B01D 11/0496; B01D 17/02; B01D 17/12; B01D 2011/002
See application file for complete search history.

(56) References Cited

FOREIGN PATENT DOCUMENTS

EP 3744851 A1 2/2020

OTHER PUBLICATIONS

Abolhasani, et al., "Oscillatory multiphase flow strategy for chemistry and biology", Royal Society of Chemistry, Jul. 1, 2016, 10 pgs.
Xu, et al., "Review of Microfluidic Liquid—Liquid Extractors", I&EC Research, June 15, 2017, 30 pgs.
Abolhasani, et al., "Multiphase Oscillatory Flow Strategy for in Situ Measurement and Screening of Partition Coefficients", Analytic Chemistry, Oct. 5, 2015, 7 pgs.
Nandagopal, et al., "Comparative study of liquid-liquid extraction in miniaturized channels over other conventional extraction methods", Microsyst Technol (2016) 22: 349-356, Dec. 13, 2014, 8 pgs.

*Primary Examiner* — Bradley R Spies
(74) *Attorney, Agent, or Firm* — Merchant & Gould P.C.

(57) ABSTRACT

A method for counter-current liquid-liquid extraction in a sub-millimeter conduit is implemented from an initial liquid drop stream. The stream has alternating drops of a first liquid, and a second liquid less wetting than the first liquid and immiscible with the first liquid. One of the liquids includes a component to extract towards the other liquid. A first pressure gradient applied along the conduit generates a visco-inertial flow displacing a first drop stream volume according to the first gradient and generating a film of first liquid displaced along the opposite orientation, the film being located between the drops of second liquid and the conduit. The application of the first pressure gradient is stopped. A second pressure gradient is applied along the conduit, in the opposite orientation to generate a viscous-capillary flow displacing a second volume of according to the second gradient and application of the second pressure gradient stops.

10 Claims, 3 Drawing Sheets

METHOD FOR COUNTER-CURRENT LIQUID-LIQUID EXTRACTION IN A SUB-MILLIMETRE CONDUIT

This application claims benefit of French Application No. 2114216, filed Dec. 22, 2021, which application is incorporated herein by reference. To the extent appropriate, a claim of priority is made to the above disclosed application.

TECHNICAL FIELD OF THE INVENTION

The present invention relates to the field of liquid-liquid extraction.

The liquid-liquid extraction is a method consisting of bringing two immiscible or poorly miscible liquid phases into contact with each other so as to allow a mass exchange of a component from one phase to the other.

SUMMARY OF THE INVENTION

There are many liquid-liquid extraction methods. For example, reference can be made to the article C. Xu and T. Xie, "*Review of Microfluidic Liquid-Liquid Extractors*", Ind. Eng. Chem. Reas., vol. 56, n°27, pp. 7593-7622 (2017), doi:10.2021/acs.iecr.7b01712 (PA1), which references several of the techniques proposed to date.

Of these, the liquid-liquid extraction methods using a sub-millimetre conduit in which the extraction can take place are particularly sought after.

"Sub-millimetre" conduit should be understood to mean a conduit with two dimensions not exceeding one millimetre. Most commonly, this conduit has a circular cross-section, but the invention can be applied to other cross-sectional shapes, for example square cross-sections.

Indeed, the miniaturisation of a liquid-liquid extraction method in a sub-millimetre conduit has several advantages.

A first interest lies in the reduction of the volumes of liquid involved. This is particularly true when the liquids concerned are dangerous or rare and expensive. This is the case, for example, for liquids comprising a radiochemical component to be extracted, which can be encountered in medical or pharmaceutical applications. Furthermore, in the event of liquid loss to the environment, the volumes involved greatly reduce the risks.

A second advantage is the permanent containment of liquids within the conduit. This containment is of course welcome for hazardous liquids, e.g. with radiochemical components. The risk of losing liquid is also limited. In addition, the containment means that the liquid elements can be manipulated easily, allowing for a simplified automation.

Finally, a third interest lies in achieving extraction performances that are difficult to achieve on a larger scale. In fact, the miniaturisation generally allows to increase the flow densities of material extracted from one liquid phase to the other, due to the higher ratio between the exchange surface area between the two liquid phases in relation to the volume occupied by each liquid phase.

There are then two main approaches to ensure a component extraction between two immiscible liquid phases in a sub-millimetre conduit.

The first approach consists of circulating the two liquid phases in co-current (same orientation).

PA1 refers to several proposed co-current techniques, including techniques implementing a sub-millimetre conduit. In co-current, a liquid-liquid exchange cannot exceed the extraction efficiency of a contact stage between liquids and therefore the extraction is generally not very quantitative. A co-current technique that is nonetheless effective is presented in more detail in J. R. Burns and C. Radshaw, "*The intensification of rapid reactions in multiphase systems using flow in capillaries*", Lab Chip, 2001, doi:10.1039/b102818a (PA2). It consists of using a stream of drops of two immiscible liquid phases, but all wetting the sub-millimetre conduit. This means that an alternation of a drop of one liquid phase with a drop of the other liquid phase and so on along the conduit. The drop stream can be generated by causing the two liquid phases to meet at the level of a tee upstream of the conduit.

The second approach is to circulate the two liquid phases in counter-current (opposite orientations). In counter-current, the advantage is that the liquids can be brought into contact with each other in several extraction stages, resulting in a quantitative transfer from one liquid phase to the other.

Various techniques have been proposed to implement this counter-current approach, which are well presented in the PA1 review. These include in particular the counter-current liquid-liquid extraction methods a) discontinuous multistage and b) continuous.

The discontinuous multistage methods a) are particularly complex to implement, either because of the mountings they require or because they involve delicate physicochemical methods to implement to separate the two liquid phases at the end of their contact, for each stage. The extraction is usually discontinuous, between two stages.

The continuous methods b) require that a separation between the two phases be maintained at all times. The most common way of operating is to implement a (solid) separation membrane between the two liquid phases circulating in counter-current. In addition to the simplicity of the associated mounting, the containment of each of the two liquid phases is therefore much simpler than with the discontinuous multistage methods. In a membrane method, one of the control parameters is the size of the pores of the membrane through which the extraction of a component from one liquid phase to the other can take place (mass transfer).

However, these membrane methods suffer from several disadvantages:
 limiting the pressure difference on either side of the membrane, at the risk of compromising the mechanical integrity of the membrane;
 limiting the mass transfer through the membrane (resistance provided by the pore size, the thickness and the tortuosity of the membrane, but also the diffusion boundary layer on either side of each of the faces of the membrane).

It is therefore difficult to design a membrane that is thick enough (to withstand the pressure difference), while ensuring an optimal mass transfer from one liquid phase to the other. The miniaturisation of the device to implement a membrane counter-current liquid-liquid extraction method therefore has intrinsic physical limitations, which are accompanied by performance losses for the extraction method.

Other techniques are based on a continuous counter-current liquid-liquid extraction method. These include the counter-current chromatography methods. Here, the separation of the liquid phases is maintained throughout the extraction method by a radial acceleration field (centrifugal force) applied to a millimetric conduit wound around a spiral. The difference in mass density between the two liquid phases is used to ensure the separation, as the centrifugal force experienced by each of the two liquid phases is not the same. For example, reference can be made to Y. Ito & R. L.

Bowman, "Counter-current chromatography with flow-through coil planet centrifuge", Science, vol. 173, no. 3995, pp. 420-422, July 1971, doi.10.1126/science.173.3995.420 (PA3). However, this approach is not very conducive to the miniaturisation, as the separation effect is less and less easy to achieve with the miniaturisation. In a similar approach, a gravity field is implemented instead of centrifugal force to separate the liquid phases. But here too, below a certain size, the separation of the liquid phases is no longer effective. The performance losses of the liquid-liquid extraction method then become significant.

One objective of the invention is to propose a method for counter-current liquid-liquid extraction in a sub-millimetre conduit with improved performance.

To this end, the invention proposes a method for counter-current liquid-liquid extraction in a sub-millimetre conduit, the method comprising the following steps implemented from an initial stream of liquid drops in the conduit, said stream being composed of an alternation of drops of a first liquid and drops of a second liquid less wetting than the first liquid and immiscible with the first liquid, one of the two liquids comprising a component to be extracted towards the other of the two liquids:

a) applying a first pressure gradient along the conduit so as to generate a visco-inertial flowing displacing a first volume of drop stream according to said first gradient and generating a film of first liquid having displaced along the opposite orientation to said first gradient, the film being located between the drops of second liquid and the conduit;

b) stopping the application of the first pressure gradient;

c) applying a second pressure gradient along the conduit, in the opposite orientation to the first pressure gradient applied in the step a) so as to generate a viscous-capillary flowing displacing a second volume of drop stream according to said second gradient; and d) stopping the application of the second pressure gradient The method according to the invention may also comprise other characteristics, including the following characteristics, taken alone or in combination:

the step d) is started when the second volume of drop stream displaced during the step c) equals the first volume of drop stream displaced during the step a);

the steps a) to d) are repeated $N_1$ times, with $N_1$ a natural number greater than or equal to the unity;

the drop stream is regular;

at the end of the step d), the steps a) to d) having been repeated advantageously $N_1$ times, a volume of first liquid is located at one of the ends of the conduit, and the method then comprises the following steps:

A) withdrawing the volume of the first liquid from the conduit through the end of the conduit where said volume is located;

B) generating a stream of liquid drops in the conduit through the conduit end through which the volume of first liquid was withdrawn in the step A), said stream consisting of an alternation of a drop of the first liquid and a drop of the second liquid;

at the end of the step B), it comprises a step C) consisting of implementing the steps a) to d);

the step C) is repeated $N_2$ times, with $N_2$ a natural number greater than or equal to the unity;

the steps A) and B) are repeated $N_3$ times, with $N_3$ a natural number greater than or equal to the unity;

the drop stream generated in the step B) is regular;

a ratio between an average velocity of the visco-inertial flowing of the step a) and an average velocity of the visco-capillary flowing of the step c) is between 2.5 and 4.

BRIEF DESCRIPTION OF THE FIGURES

Further characteristics and advantages of the invention will become apparent from the following detailed description, for the understanding of which reference is made to the attached drawings, for which:

The FIG. 1 represents a simplified diagram of a device capable of implementing a liquid-liquid extraction method in accordance with the invention;

Figure 2:
Figure 3:
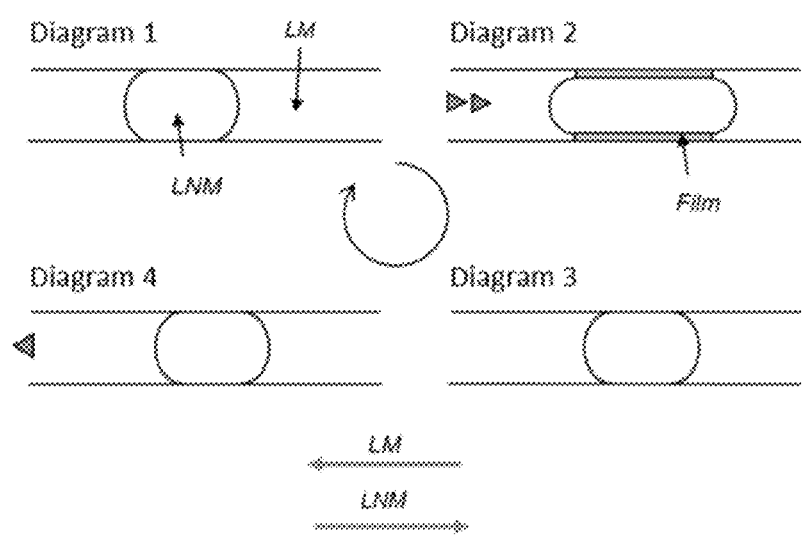
Figure 4:
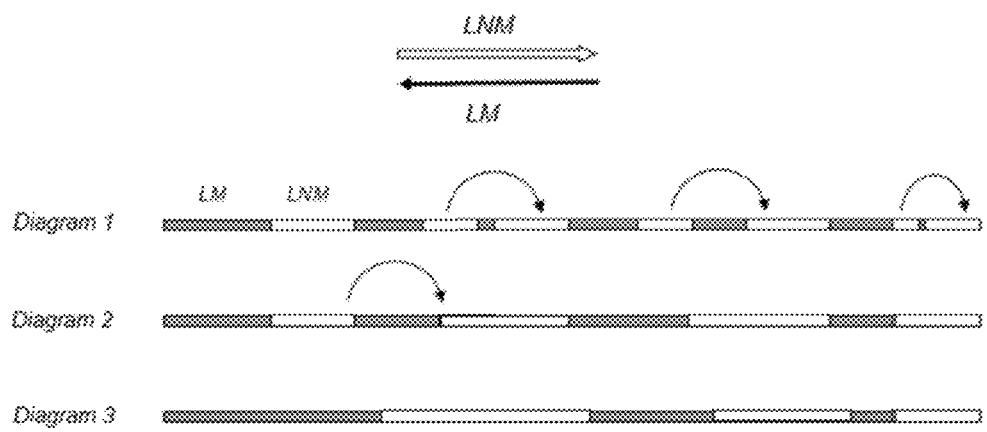
Figure 5:
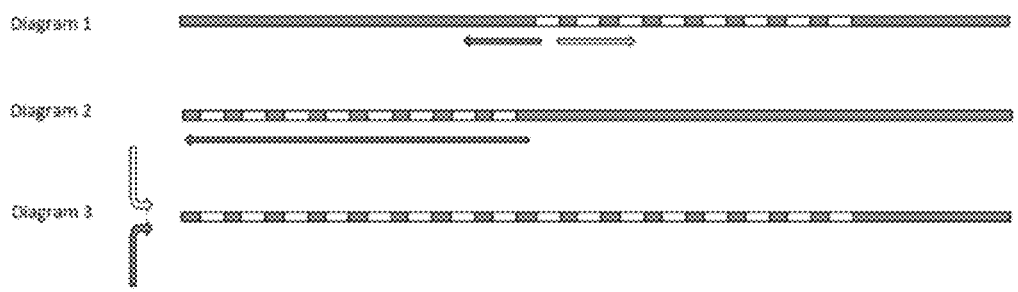
Figure 6:
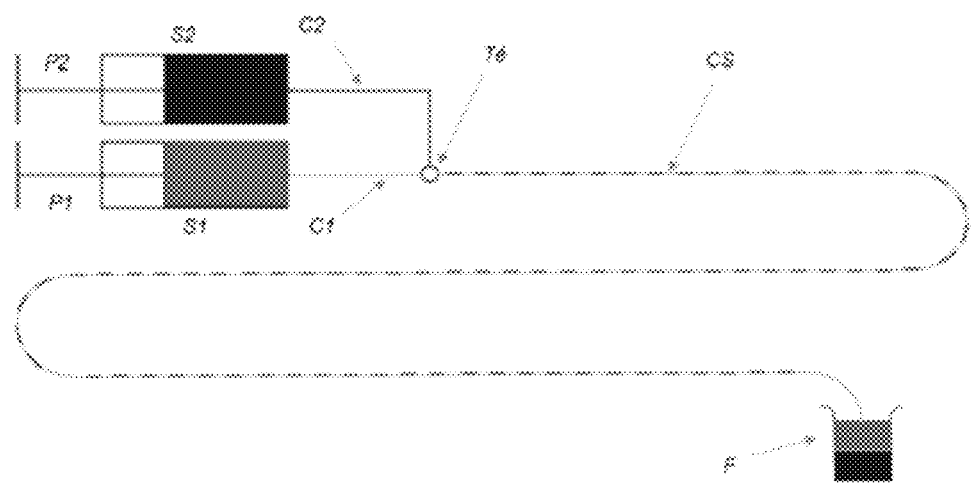

The FIG. 2 represents a sub-millimetre conduit comprising a stream of drops of liquids, formed by an alternation of a drop of first liquid and of second liquid less wetting than the first liquid and immiscible with the first liquid, from which the method in accordance with the invention is implemented;

The FIG. 3, which comprises 4 diagrams, represents a period of oscillation, i.e. the respective displacements, in counter-current, of the drops of the first liquid and the drops of the second liquid, during the implementation of the method according to the invention;

The FIG. 4, which comprises 3 diagrams, represents the evolution of the initial drop stream shown in FIG. 2 during the repeated implementation of several oscillation periods according to the successive diagrams of FIG. 3;

The FIG. 5, which comprises 3 diagrams, represents other steps in the method according to the invention aimed at generating a new stream of liquid drops formed by an alternation of a drop of first liquid and a drop of second liquid;

The FIG. 6 is a simplified diagram of a device actually produced to implement the method according to the invention.

DETAILED DESCRIPTION OF THE INVENTION

The invention proposes a method for counter-current liquid-liquid extraction in a sub-millimetre conduit.

The starting point is a situation in which a stream of liquid drops is provided in the conduit, said stream being composed of an alternation of drops of a first liquid LM and a second liquid LNM which is less wetting than the first liquid and immiscible with the first liquid, one of the two liquids furthermore comprising a component to be extracted towards the other of the two liquids.

The method according to the invention then aims to implement the following steps:

a) applying a first pressure gradient along the conduit so as to generate a visco-inertial flowing displacing a first volume of drop stream according to said first gradient and generating a film of first liquid having displaced along the opposite orientation to said first gradient, the film being located between the drops of second liquid and the conduit;

b) stopping the application of the first pressure gradient;

c) applying a second pressure gradient along the conduit, in the opposite orientation to the first pressure gradient applied in the step b) so as to generate a viscous-capillary flowing displacing a second volume of drop stream according to said second gradient; and d) stopping the application of the second pressure gradient.

The implementation of the steps a) to d) defines an oscillation period.

Figure 1:
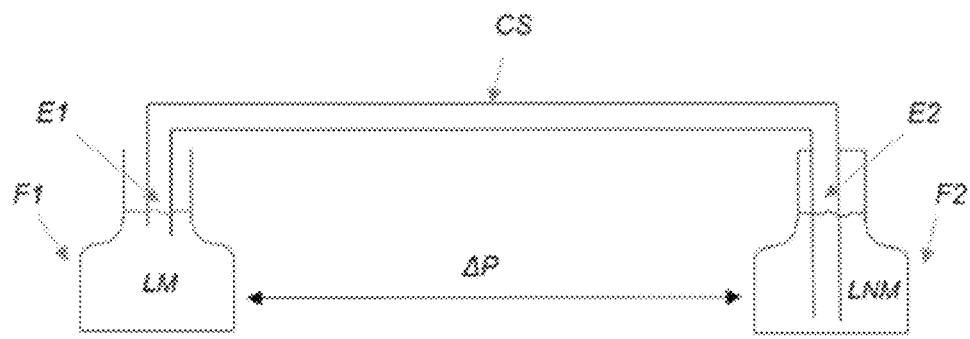

This can be better understood by reference to FIGS. 1 to 3.

FIG. 1 shows a device that can implement the method described above. FIG. 2 shows the starting situation with the drop stream of the two liquid phases involved. Finally, in FIG. 3, the physical phenomena involved in explaining the counter-current displacement of the two liquid phases present in the sub-millimetre conduit with the implementation of the steps of the method according to the invention are shown.

In FIG. 1, a first, open vial F1 containing the first liquid LM and a second, closed vial F2 containing the second liquid LNM are shown. The two vials F1, F2 are connected by a sub-millimetre conduit CS whose ends E1, E2 are immersed in the first liquid LM of the first vial F1 and the second liquid LNM of the second vial F2 respectively. The fact that the second vial F2 is closed allows the pressure in it to be controlled by any suitable means (not shown), while the first vial F1 is open and remains at ambient (atmospheric) pressure. A pressure gradient can therefore be applied along the sub-millimetre conduit.

In the initial situation, i.e. before implementing the method according to the invention as described above, the situation shown in FIG. 2 is taken as a starting point.

This drop stream can be obtained using two tanks (not shown in FIG. 1), one for the first liquid LM and the other for the second liquid LNM, each tank being connected by a capillary to an inlet of a tee, the outlet of which opens into the sub-millimetre conduit. In the initial situation, there is an alternation of a drop of the first liquid with a drop of the second liquid along the sub-millimetre conduit CS.

As can be seen in FIG. 2, the initial drop stream is not necessarily regular, nor are the drop volumes equal. In fact, in order to perform the liquid-liquid exchange operation, it is possible to inject into the sub-millimetre conduit CS a desired ratio, referred to as a, between the average flow rate $Q_{LM}$ of first liquid and the average flow rate $Q_{LNM}$ of second liquid. This ratio is therefore written $\alpha=Q_{LM}/Q_{LNM}$. Depending on this ratio $\alpha$ in particular, we will have a more or less regular stream of drops. However, a regular stream is advantageous in order not to degrade the performance too much.

The diagram 1 in FIG. 3 is an enlarged view of FIG. 2 at the level of a drop of second liquid. A single drop of second liquid LNM is observed, on either side of which is located a drop of first liquid LM. Each drop of liquid, when stationary, is in contact with the internal wall of the sub-millimetre conduit CS and there is an interface between the drop of second liquid LNM and each drop of first liquid LM, due to the surface tension (the liquids are immiscible).

From this situation, the step a) is implemented.

This is achieved by ensuring that the pressure in the second vial F2 is lower than the pressure in the first vial F1. The pressure gradient thus generated then pushes the whole stream of drops towards the second vial F2. A first volume of drop stream is therefore displaced in the orientation of the pressure gradient applied during this step (i.e. from the left to the right, as indicated by the double arrow in the diagram 2 of FIG. 3). The pressure difference must be large enough to generate an advance into a visco-inertial flowing regime. In this flowing regime, the viscous forces and the inertial forces (acceleration) are important due to the velocity generated by the pressure gradient. The surface tension forces (capillary), in particular with the internal wall of the sub-millimetre conduit CS (which, in turn, do not change with the velocity of the flowing) are then negligible compared to the viscous and inertial forces. In this flowing regime, a drop of second liquid LNM tends to elongate and move away from the internal wall of the sub-millimetre conduit and a film of first liquid is inserted between the drop of second liquid and the internal wall of the sub-millimetre conduit CS. The first liquid LM forming the film comes from the drop of first liquid located to the right of the drop of second liquid LNM. The first liquid supplying the film therefore displaces in the opposite direction to the pressure gradient applied during this step a). However, there is an overall displacement of the drops of first liquid and the drops of second liquid in the orientation of the pressure gradient applied during this step a).

In the step b), the application of this pressure gradient is stopped.

A relaxation is then observed in the diagram 3 in FIG. 3 where the drop of second liquid LNM re-bonds to the internal wall of the sub-millimetre conduit CS. This re-bonding phenomenon also implies that the first liquid in the film is pushed towards the left, causing the film to disappear. The situation is then comparable to the starting situation, except that the drop stream as a whole, and thus the second liquid drop in particular, has displaced in the orientation of the gradient applied in the step a), and first liquid has displaced from the first liquid drop LM located to the right of the second liquid drop LNM towards the first liquid drop located to the left of the first liquid drop.

There was therefore a relative exchange between the first liquid and the second liquid.

At this point, however, the whole volume of liquid (i.e. the whole drop stream) in the sub-millimetre conduit has displaced towards the right, in the direction of the vial F2.

In the step c), a pressure gradient is then applied between the two vials F1, F2 which is opposite to the pressure gradient applied in the step a). This can be performed by increasing the pressure at the level of the second vial F2. Furthermore, the pressure gradient applied during this step c) is lower (in absolute value) than that applied during the step a) so that the flowing regime is a viscous-capillary regime (flowing velocity, in absolute value, lower than for the step a). In this flowing regime, the predominant forces are the viscous forces and the surface tension (capillary) forces. The inertial forces are negligible. This flowing regime has the effect of displacing the drops of first liquid and the drops of second liquid in the direction imposed by the pressure gradient, i.e. from the right towards the left in direction of the first vial F1. This time, the segment of the first liquid likely to be retained on the wall of the capillary is very small (in practice negligible). This can be seen in FIG. 3, diagram 4.

The step c) makes the general counter-current movement between the two liquid phases effective. This counter-current movement can be more or less important.

The application of this gradient is then stopped in the step d).

At the end of the step d), the situation is similar to the starting situation (diagram 1 in FIG. 3), except that the drops of the second liquid have displaced towards the right and the drops of first liquid have displaced towards the left.

Advantageously, the step d) is implemented when the second volume of drop stream displaced during the step c) equals the first volume of drop stream displaced during the step a). This implies that the volume of the drop stream finally displaced is zero-sum. There was then a total counter-current displacement between the two liquid phases, i.e.

without any overall movement of the initial drop stream (initial=diagram 1 in FIG. 3).

The performance of this liquid-liquid extraction method is very interesting.

This is due, on the one hand, to the large exchange surface available between the two liquid phases that the method implements, ab initio, with the starting drop stream and, on the other hand, to the fact that a stable interface between the two liquid phases (first liquid and second liquid less wetting) is maintained during the implementation of the steps a) to d). This stability is in particular related to the control of the pressure (essentially longitudinal pressure gradient) which is substantially the same at the level of a given section of the sub-millimetre conduit and thus of a first liquid/second liquid interface at the level of that section. The applied pressure gradient also allows to ensure that the two liquid phases displace in counter-current to achieve the desired extraction.

The method according to the invention is particularly conducive to the miniaturisation of the device to implement it. Indeed, the miniaturisation of the sub-millimetre conduit (which may imply higher viscous and capillary forces) can be compensated by the pressure gradient applied during the method to obtain the above-mentioned operation (visco-inertial regime and then viscous-capillary regime), without calling into question the efficiency of the extraction method, quite the contrary. In fact, all other things being equal, the miniaturisation allows to increase the exchange surface ratio between drops of the two liquid phases with respect to their respective volumes.

The device is also relatively simple (no moving mechanical parts, no multi-stage, no membrane likely to be subject to high pressure differences at the level of the interface between the two liquid phases, etc.).

Advantageously, the steps a) to d) can be repeated $N_1$ times, with $N_1$ a natural number greater than or equal to the unity. This, it is understood, allows the whole of drops of second liquid to be advanced towards the second vial F2 and the whole of drops of first liquid towards the first vial F1.

However, by repeating the steps a) to d) of the method according to the invention a number of times, it can be seen that the drop stream tends to generate large drops of liquid (both for the first liquid and for the second liquid), as the smaller drops tend to aggregate into the larger ones.

This can be seen in FIG. 4.

This gradually leads to a situation where the drops become larger and larger (diagram 1 towards the diagram 3 in FIG. 4). The diagram 3 in FIG. 4 is a particularly advanced example of this phenomenon.

Thus, by continuing these oscillations, all of the second liquid may be at the right end and the first liquid at the left end without showing any alternations. Thus, the drop stream is gradually destroyed by the respective displacements of the two liquids. From the above, it is understood that it is the alternation of the drops of first liquid and second liquid in a drop stream that allows the liquids to displace in counter-current.

To avoid this situation, the drop stream should be regenerated, in particular after a given number $N_1$ of oscillation periods.

Otherwise, this may have an impact on the extraction performance of the method as the contact surface areas between a drop of first liquid and second liquid tend to decrease (assuming that the extraction of a component from one liquid phase to the other could not be almost completely performed, e.g. in the situation of the diagram 3 in FIG. 4). Most importantly, this can have an impact on the treatment volume flow rate of the method, i.e. the amount of component extracted per unit time by the method. Indeed, it can be seen that this flow rate is all the higher the more the drop stream is composed of a multitude of small drops, i.e. drops of short length.

Therefore, it may sometimes be useful to ensure that the situation remains close to the diagram 1 in FIG. 4, before implementing the steps a) to d) of the liquid-liquid extraction method according to the invention again.

Thus, at the end of the step d), the steps a) to d) having been repeated advantageously $N_1$ times, a volume of first liquid is located at one of the ends of the conduit.

The method can then advantageously comprise the following additional steps:

A) withdrawing the volume of first liquid from the conduit through the end of the conduit where said volume is located;
B) generating a stream of liquid drops in the conduit through the conduit end through which the volume of first liquid was withdrawn in the step A), said stream consisting of an alternation of a drop of first liquid LM and a drop of second liquid LNM.

Here too, the drop stream is advantageously regular, for the reasons already mentioned.

This is explained in FIG. 5.

In this figure, still starting from the situation in FIG. 2, we find ourselves, after the implementation of $N_1$ repetitions of the steps a) to d), in the situation of the diagram 1 in FIG. 5, which could therefore be that of the diagram 3 in FIG. 4.

In this case, the volume of first liquid is drawn from the side of the first vial F1, as shown in the diagram 2 in FIG. 5.

Then a new drop stream is generated according to the step B), as shown in the diagram 3 in FIG. 5. A new drop stream, with small drops, is then injected into the sub-millimetre conduit. This allows to maintain an optimal situation ensuring an optimal treatment volume flow rate and a reduced risk of performance losses in the extraction method.

By adjusting the volume withdrawn in the step A) and the respective volumes of the two liquids re-injected into the sub-millimetre conduit in the step B), the relative exchange ("hold-up) of the two liquid phases can be controlled. In other words, the ratio of the magnitude of the respective counter-current flow rates to the volume of each of the liquid phases can be controlled in the sub-millimetre conduit.

We recall that $\alpha=Q_{LM}/Q_{LNM}$ is the ratio of the average flow rate of first liquid to the average flow rate of second liquid. Note $\beta$ the ratio of the volume of first liquid to the volume of second liquid. Note V the volume of first liquid withdrawn in the step A), $V_{LM}$ the volume of first liquid injected in the step B) and $V_{LNM}$ the volume of second liquid also injected in the step B) to generate the drop stream. It is then possible to impose an operation at a given ratio $\alpha$ while guaranteeing a given ratio $\beta$. More precisely, we have $V-V_{LM}=\alpha*V_{LMN}$, furthermore imposing that $\beta=V_{LM}/V_{LNM}$.

Thus, the method allows counter-current extraction according to a given ratio of flow rates of the liquid phases and a given ratio of volumes of said liquid phases.

A step C) can then be added, which consists of implementing the steps a) to d).

Advantageously, the step C) can be repeated $N_2$ times, with $N_2$ a natural number greater than or equal to the unity.

Similarly, if useful, the steps A) and B) can be repeated $N_3$ times, with $N_3$ a natural number greater than or equal to the unity.

We will now present a concrete example of implementation using FIG. 6. FIG. 6 is an in-process representation, i.e. neither in the initial nor in the final state.

The entire implementation can be automated and also managed remotely.

A concrete mounting with two syringes S1, S2 is provided, one of which comprises a first liquid and the other comprises a second liquid. The first liquid is a mixture of ISANE 185 with 30% tributyl phosphate (TBP). The second liquid is a mixture of water and nitric acid, the mixture having a molarity of 4M. The second liquid is less wetting than the first liquid and the two liquids are immiscible. In this example, the component to be extracted from one liquid phase to the other in the liquid-liquid extraction method is nitric acid, which is therefore initially in the second liquid to be extracted towards the first liquid. The mixtures thus formed are immiscible. Each syringe comprises a capillary C1, C2 at the outlet, the capillaries meeting at the level of a distribution tee opening into a sub-millimetre conduit CS. The sub-millimetre conduit CS is made of polytetrafluoroethylene (PTFE), with a circular cross-section with an internal diameter of 750 μm and a length of 1.8 m. The sub-millimetre conduit CS is laid flat on a table. At the other end of the sub-millimetre conduit is a vial F for collecting the liquid. In an alternative embodiment, it may be possible to wind the sub-millimetre conduit on a cylinder with a diameter greater than 2 cm, which works equally well.

The initial state is as follows.

The sub-millimetre conduit CS is filled with first liquid. The syringe S1 which is empty. The syringe S2 is filled with 1 mL of second liquid. The capillaries C1 and C2 are filled with their respective liquid. The vial F is filled with first liquid. The end of the sub-millimetre conduit CS dips into the first liquid at the interface between the air and the free surface of the first liquid.

46 μL of the first liquid is then drawn into the syringe S1 by pulling the piston P1 of the syringe S1.

A stream of drops of first liquid and second liquid is then injected.

Once the stream of drops of first liquid and drop of second liquid has been generated, the steps a) to d) of the method are then implemented.

The step a) is done so as to generate a visco-inertial flowing with an average flowing velocity of 0.4 m/s in the sub-millimetre conduit. This is performed by pushing the piston P1 of the syringe S1 containing the first liquid, which applies an overpressure at the level of the tee with respect to the pressure at the level of the vial F. And the step c) is done in such a way as to generate a viscous-capillary flowing with an average flowing velocity of 0.04 m/s in the sub-millimetre conduit. This is performed by pulling the piston P1 of the syringe S1. This implies a vacuum at the level of the tee with respect to the pressure at the level of the vial F. The duration of this step c) is 10 times longer than the duration of the step a) so that at the end of one oscillation period, the total volume (first liquid+second liquid) injected into the sub-millimetre conduit is zero sum.

The steps a) to d) are implemented $N_1=10$ times in succession.

At the end of these 10 repetitions (or 10 periods of oscillation), the drops of second liquid advance approximately 15 cm down the sub-millimetre conduit towards the vial F (corresponding to a displaced volume of 66 μL).

Next, the steps A) and B) of the method described above (cycle) are implemented.

Thus, 64 μL of wettable liquid is withdrawn (step A) from the sub-millimetre conduit CS from the tee to the syringe S1. This is performed at a flow rate of 15 μL/s.

Then (step B)), 32 μL of second liquid and 32 μL of first liquid are injected concomitantly through the tee at the same flow rate of 5 μL/S for each liquid, so as to obtain a stream of drops formed by a regular alternation of drops of first liquid and second liquid. This is performed by pressing the pistons P1, P2. The ratio α, as defined above, is thus α=1 in this example.

The steps described above were then repeated in 313 oscillation periods ($=N_1+N_2$) and in $N_3=31$ cycles, so that the vial F was emptied of its first liquid and filled completely with the second liquid.

The procedure described above has the following characteristics:
- an extraction performance equivalent to that of a multi-stage counter-current liquid-liquid extraction method of 3.2 theoretical stages in 1.8 m of sub-millimetre conduit, and
- an average flow rate of 0.5 μL/s.

We will now present other concrete examples that have been implemented.

In the previous example, the step a) was carried out with an average flowing velocity of 0.4 m/s in the sub-millimetre conduit and the step c) with an average flowing velocity of 0.04 m/s, i.e. a ratio of 10 to the nearest measurement error.

However, other tests were carried out, all other things being equal, with different average flowing velocity ratios between the step a) and the step c), while of course maintaining the average velocity at a value ensuring a visco-inertial type flowing during the step a) and at a value ensuring a visco-capillary type flowing during the step c). It was then found that a ratio of approximately 3.3 (which can be described as optimal) and more broadly between 2.5 and 4 (taking due account in particular of the margins of error associated with the determination of the velocity) between the average velocity of the visco-inertial flowing in the step a) and the average velocity of the visco-capillary flowing in the step c), enabled to obtain a maximised average flow rate.

This optimal ratio could be found for many values of the average flowing velocity in the step a).

A sub-millimetre conduit with a diameter of 300 microns was also tested. All other characteristics and operating conditions were maintained. Again, it was found that an optimum ratio of about 3.3, and more broadly between 2.5 and 4, between the average visco-inertial flowing velocity of the step a) and the average visco-capillary flowing velocity of the step c), resulted in a maximised average flow rate.

Again, this optimal ratio could be found for many values of the average visco-inertial flowing velocity of the step a).

For example, for an average flowing velocity in the step a) of 0.56 m/s, the maximum average flow rate, in this case 0.8 μL/s, was obtained for an average velocity in the step c) of 0.17 m/s. This average flow rate of 0.8 μL/s is estimated in the same way as the average flow rate of 0.5 μL/s obtained with the example where the step a) is carried out with an average velocity flowing of 0.4 m/s in the sub-millimetre conduit and the step c) with an average velocity flowing of 0.04 m/s, i.e. a ratio of 10. In other words, the ratio $\alpha = Q_{LM}/Q_{LNM}$ is unity. In practice, it was chosen to determine the average flow rate $Q_{LM}$ of the wetting phase—which is determined with respect to the submillimetre conduit in which the first liquid, which is more wetting than the second liquid, flows.

Identical findings were made with a 500 micron diameter sub-millimetre conduit, all other things being equal, which allows the findings to be generalised to much different diameters of the sub-millimetre pipe (300, 500 and 750 microns).

This is of particular interest for industrial application because it appears that, independently of the diameter of the submillimetre conduit, it is of interest that the ratio of the average flow rate during the step a) is 2.5 to 4 times greater than the average flow rate during the step c).

Note that the value of the maximum average flow rate increases with the value of the average visco-inertial flowing velocity in the step a).

The invention claimed is:

1. A method for counter-current liquid-liquid extraction in a sub-millimetre conduit, the method being implemented from an initial stream of liquid drops in the conduit, said stream comprising alternating drops of a first liquid and drops of a second liquid less wetting than the first liquid and immiscible with the first liquid, one of the two liquids comprising a component to be extracted towards the other of the two liquids; the method comprising the following steps:
   a) applying a first pressure gradient along the conduit with a pressure difference sufficiently large to generate a visco-inertial flow displacing a first volume of drop stream according to said first gradient and generating a film of first liquid displaced along an opposite orientation to said first gradient, the film being located between the drops of second liquid and the conduit;
   b) stopping the application of the first pressure gradient;
   c) applying a second pressure gradient along the conduit, in the opposite orientation to the first pressure gradient applied in the step a) and lower, in absolute value, than the first pressure gradient applied during the step a) to generate a viscous-capillary flow displacing a second volume of drop stream according to said second gradient; and
   d) stopping the application of the second pressure gradient.

2. The method according to claim 1, wherein the step d) is started when the second volume of drop stream displaced during the step c) equals the first volume of drop stream displaced during the step a).

3. The method according to claim 1, wherein the steps a) to d) are repeated $N_1$ times, with $N_1$ a natural number greater than or equal to the unity.

4. The method according to claim 1, wherein the drop stream is regular.

5. The method according to claim 1, wherein at the end of the step d), the steps a) to d) having been repeated $N_1$ times, a volume of first liquid is located at one end of the conduit, the method further comprising the following steps:
   A) withdrawing the volume of first liquid from the conduit through the conduit end where said volume is located;
   B) generating a stream of liquid drops in the conduit through the conduit end through which the volume of first liquid was withdrawn in the step A), said stream comprising an alternation of a drop of the first liquid (LM) and a drop of the second liquid.

6. The method according to claim 5, wherein, after the step B), the method further comprises a step C) comprising implementing the steps a) to d).

7. The method according to claim 6, wherein the step C) is repeated $N_2$ times, with $N_2$ being a natural number greater than or equal to the unity.

8. The method according to claim 5, wherein the steps A) and B) are repeated $N_3$ times, with $N_3$ being a natural number greater than or equal to the unity.

9. The method according to claim 6, wherein the drop stream generated in the step B) is regular.

10. The method according to claim 1, wherein a ratio between an average velocity of the visco-inertial flowing of the step a) and an average velocity of the visco-capillary flowing of the step c) is between 2.5 and 4.

* * * * *